United States Patent
Mentre et al.

(10) Patent No.: US 11,755,463 B2
(45) Date of Patent: Sep. 12, 2023

(54) METHOD TO GENERATE TEST SUITE FOR SOURCE-CODE

(71) Applicant: MITSUBISHI ELECTRIC CORPORATION, Tokyo (JP)

(72) Inventors: David Mentre, Rennes (FR); Denis Cousineau, Rennes (FR); Eric Lavillonniere, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 70 days.

(21) Appl. No.: 16/970,671

(22) PCT Filed: Mar. 7, 2019

(86) PCT No.: PCT/JP2019/010432
§ 371 (c)(1),
(2) Date: Aug. 18, 2020

(87) PCT Pub. No.: WO2019/188313
PCT Pub. Date: Oct. 3, 2019

(65) Prior Publication Data
US 2020/0379888 A1    Dec. 3, 2020

(30) Foreign Application Priority Data

Mar. 26, 2018 (EP) .................................. 18305333

(51) Int. Cl.
*G06F 11/36* (2006.01)
*G06F 17/11* (2006.01)

(52) U.S. Cl.
CPC ...... *G06F 11/3684* (2013.01); *G06F 11/3676* (2013.01); *G06F 17/11* (2013.01)

(58) Field of Classification Search
CPC ... G06F 11/3676; G06F 11/3684; G06F 17/11
See application file for complete search history.

(56) References Cited

U.S. PATENT DOCUMENTS 6,993,747 B1    1/2006  Friedman
9,043,759 B1 *  5/2015  Lininger ............. G06F 11/3672
                                                    717/124

(Continued)

OTHER PUBLICATIONS

Pascal Cuoq et al. "Frama-C," 2012 [retrieved on Apr. 21, 2022], SEFM 2012: Software Engineering and Formal Methods pp. 233-247, downloaded from <url>:https://link.springer.com. (Year: 2012).*

(Continued)

*Primary Examiner* — S. Sough
*Assistant Examiner* — Stephen D Berman
(74) *Attorney, Agent, or Firm* — BIRCH, STEWART, KOLASCH & BIRCH, LLP

(57) ABSTRACT

A method (100) to generate test suite for a source-code (1). The method comprises: a) implementing a structural analysis (101) of said source-code (1) to obtain a completed source-code (1) including: —parsing the source-code, —addition of annotations defining tests objectives, —generation of stubs; b) implementing at least one semantic analysis algorithm including categorizing each set of tests objectives as satisfied, impossible to satisfy or unsatisfied; c) feeding a first list (11) with satisfied test cases; d) feeding a second list (21) with test objectives impossible to satisfy, e) implementing at least one mathematical optimization algorithm (103) on parts corresponding to unsatisfied test objectives; —identifying test cases (113) that satisfy at least a part of said test objectives, —feeding said first list of set of test cases with them, —categorizing said test objectives as satisfied; f) providing a test suite comprising the two lists.

9 Claims, 5 Drawing Sheets

(56) References Cited

U.S. PATENT DOCUMENTS

| | | | |
|---|---|---|---|
| 2011/0173591 A1* | 7/2011 | Prasad | G06F 8/10 |
| | | | 717/126 |
| 2013/0042145 A1* | 2/2013 | Pasupuleti | G06F 11/3684 |
| | | | 714/E11.208 |
| 2015/0339104 A1* | 11/2015 | Frenkiel | G06F 11/3604 |
| | | | 717/113 |
| 2016/0034375 A1* | 2/2016 | Sinha | G06F 11/3692 |
| | | | 717/131 |
| 2016/0124827 A1 | 5/2016 | Gangadhar et al. | |
| 2018/0321918 A1* | 11/2018 | McClory | H04L 41/5041 |

OTHER PUBLICATIONS

Negar Koochakzadeh et al., "Social Network Analysis in Software Testing to Categorize Unit Test Cases Based on Coverage Information," 2011 [retrieved on Apr. 6, 2023], IEEE International Conference on High Performance Computing and Communications, pp. 412-416, d<url>:https://ieeexplore.ieee.org. (Year: 2011).*

Examination Report dated Sep. 9, 2021 in counterpart Indian Application No. 202047038611 with an English Translation.

Bloem et al., "Automating Test-Suite Augmentation", 2014 14th International Conference on Quality Software, IEEE, Oct. 2, 2014, pp. 67-72.

* cited by examiner

```
1   int f(int a, int b)
2   {
3       int ret = 6;
4
5       if (a < 10) {
6           ret = g(a);
7
8           if (a > 12) {
9               ret = 13;
10          }
11      }
12
13      return ret;
14  }
15
16  int g(int a)
17  {
18      return (a / 2)+1;
19  }
```

Lines 1–14: 51
Lines 16–19: 53

FIG. 4

```
1    int f(int a, int b)
2    {
3        int ret = 6;
4
5        // test objective: a == MIN_INT32
6        // test objective: a == MAX_INT32
7        // test objective: a == 9
8        // test objective: a == 10
9        // test objective: a == 11
10       if (a < 10) {
11           ret = g(a);
12
13           // test objective: a == MIN_INT32
14           // test objective: a == MAX_INT32
15           // test objective: a == 11
16           // test objective: a == 12
17           // test objective: a == 13
18           if (a > 12) {
19               ret = 13;
20           }
21       }
22
23       return ret;
24   }
```

```
26   int g_stub(int a)
27   {
28       return 1;
29   }
```

FIG. 6

METHOD TO GENERATE TEST SUITE FOR SOURCE-CODE

TECHNICAL FIELD

The invention pertains to the technical field of software developments and more specifically to the field of testing of source-code.

BACKGROUND ART

In conventional development of software, a great part of the development time is dedicated to test the software and the source-code in order to identify risks of malfunction and to correct the sources of such risks. More specifically, unit tests focus on testing a single program unit (function, method, class). To do such testing, one starts from a source file containing the function under test and the function name. Then a test sheet containing the test cases exercising the test function has to be produced.

It is natural to try to automatize the finding of relevant test cases in order to reduce the time, costs and risks of human errors. Some of known method enables to automatically generate relevant test cases satisfying a given coverage criteria. For example, "Path Crawler/Ltest" is commercially known to automatically generate relevant test cases. But such methods work only if the source-code contains annotations with relevant test objectives. In other words, a human work is still needed to manually annotate the source-code of the functions under test. In other software, the source code is analyzed and a list of inputs is presented to the user. Random or heuristically based inputs can be proposed by the software. Some of software provides automatically some test cases. In most cases, the test cases automatically generated are not complete. The user has to manually review and fill the relevant inputs in order to match the target coverage criteria. From these manual operations, the software generates a test sheet.

In some partially automated process, the outputs do not contain any information about the part of the source-code for which no test cases have been generated. At most, the non-tested parts are identified but the reasons of the fail to find test cases are unknown. As a consequence, a tedious and costly human work is then needed to identify, check, and sometimes correct, the non-tested part of the source-code.

The invention improves the situation.

SUMMARY OF INVENTION

It is proposed a method to generate test suite for a source-code, test cases being preliminary stored on a memory accessible to computer means, the method being implemented by said computer means. The method comprises:
 a) implementing a structural analysis of said source-code to obtain a completed source-code including:
  parsing the source-code,
  addition of annotations defining tests objectives into the source-code,
  generation of stubs corresponding to the source-code;
  completed source-code including categorizing each set of tests objectives into a single one of the following categories:
   i/ set of tests objectives that are satisfied by using as inputs test cases including test parameters stored on the memory;
   ii/ set of tests objectives that are impossible to satisfy with any test case;
   iii/ set of tests objectives that are, at least temporarily, unsatisfied;
 c) feeding a first list of set of test cases with test cases that satisfy the test objectives of category i/;
 d) feeding a second list of test objectives with test objectives that are impossible to satisfy and pertaining to category ii/,
 e) if the category iii/ is not empty, implementing at least one mathematical optimization algorithm on parts of said completed source-code corresponding to test objectives of category iii/ including:
  identifying test cases that satisfy at least a part of said test objectives,
  feeding said first list of set of test cases with test cases that satisfy said test objectives,
  categorizing said test objectives in category i/;
 f) providing a test suite comprising said first list obtained in step c and completed in step e and said second list obtained in step d corresponding to said source-code.

Such a method enables to automatically generate structural tests suite for a source-code. As a result, a first part of the source-code could be automatically checked and validated. The remaining parts of the source-code (if they exist) are associated to messages (understandable by a human) explaining the reasons of the non-testable state. As a consequence, there is no need of human work to distinguish the non-testable parts and the testable parts of a source-code. The specific sequenced combination of semantic analysis and mathematical optimization algorithm enables to quickly identify parts of the source-code for which the impossibility to establish a test is (mathematically) proven. As a result, some of time and computing resources are preserved (not consumed to look for an impossible solution). The general efficiency of the method is enhanced with respect to known methods while being totally automatized. The rate of completeness of the tests is known. In some cases, the automatic results are equivalent to those obtained by known methods but the time and computing resources consumed to obtain the results are reduced.

In another aspect, the applicant proposes a computer software comprising instructions to implement a method as defined here when the software is executed by a processor. In another aspect, the applicant proposes a computer-readable non-transient recording medium on which a software is registered to implement the method as defined here when the software is executed by a processor.

The method can optionally comprise the following features, separately or in combination one with the others:

The method further comprises the following supplementary preliminary step, before step b of implementing at least one semantic analysis algorithm, comprising implementing at least one mathematical optimization algorithm on parts of said completed source-code, including:
 identifying test cases that satisfy at least a part of said test objectives,
 feeding said first list of set of test cases with test cases that satisfy said test objectives,
 categorizing said test objectives in category i/. This enables to initially identify some test cases for at least some source-code even before implementing a mathematical optimization.

The step e is implemented a first time with a first mathematical optimization algorithm, and then, the step e is implemented at least a second time with a second mathematical optimization algorithm different from the first mathematical optimization algorithm. This enables to enhance the completeness of the identification of different type of test cases for a same source-code and to choose the level of completeness of the test suite by adding some mathematical optimization algorithm (or optimum search) in the method.

The step e is implemented at least one time with at least one mathematical optimization algorithm, and then, before step f, the series of the following steps b', c' and d' is implemented at least one time:

b') implementing at least one supplementary semantic analysis algorithm on parts of said completed source-code corresponding to test objectives of category iii/ such that to categorize at least a part of said test objectives into categories i/ or ii/;

c') feeding said first list of set of test cases with test cases that satisfy the test objectives of category i/;

d') feeding said second list of test objectives with test objectives that are impossible to satisfy and pertaining to category ii/. This enables to enhance the completeness of the test suite at will, for example only when the version of the source-code is final or almost final.

The step d further comprises associating, to each test objective impossible to satisfy and pertaining to category ii/, information about the reason of impossibility to be satisfied, said information being in a natural language. This enables to quickly identify, for an operator, any abnormal situation, and correct it if possible.

At least one semantic analysis algorithm is one of the following:

the "Value Analysis" module of "Frama-C"
"CBMC", and
the "PathCrawler" module of "Frama-C". These semantic analysis algorithms show specifically good results on examples of source-code tested by the applicant.

The method comprises the following steps in this order:

b) implementing the "Value Analysis" module of "Frama-C" on said completed source-code;

e) if the category iii/ is not empty, implementing a genetic algorithm on parts of said completed source-code corresponding to test objectives of category iii/;

b') implementing the CBMC analysis algorithm b") implementing the PathCrawler analysis algorithm of "Frama-C". This specific combination of algorithms shows specifically good results on examples of source-code tested by the applicant.

Other features, details and advantages will be shown in the following detailed description and on the figures.

BRIEF DESCRIPTION OF DRAWINGS

FIG. 4 is a typical example of a part of an original source-code to test.

FIG. 5 is the part of the source-code of FIG. 4 after that annotations are added.

FIG. 6 is an example of a generation of a stub in a source-code.

DESCRIPTION OF EMBODIMENTS

Figures and the following detailed description contain, essentially, some exact elements. They can be used to enhance understanding the invention and, also, to define the invention if necessary.

In the following, a precise wording is used. Some definitions are thus given bellow:

Where "f" is a function under test (in some language) of the source-code to test, a "test objective" is the combination of a particular statement s of the function f and a Boolean formula F;

A "set of tests parameters" for f, is a set of values assigned to all input parameters of f and all global variables f can access;

It is considered that a "set of tests parameters satisfies a test objective" (s, F) if, and only if, when executing f, using the set of tests parameters, statement s is reached and the equation F is true at the entry point of statement s (i.e. just before the execution of s);

It is considered that a "test objective is impossible (to satisfy)" if, and only if, it does not exist a set of tests parameters that satisfies that test objective.

A "test suite" for f is a set of sets of parameters for f;

A "test suite satisfies a set of tests objectives", if each test objective is either impossible or satisfied by a set of tests parameters belonging to the test suite;

A "(structural) coverage criteria" defines syntactically a set of test objectives for some function. It is considered that a test suite satisfies a coverage criteria for a function (respectively a program), if it satisfies all the tests objectives defined by the coverage criteria for that function (respectively for that program);

A "stub" of a function "g" is a function that has the same type signature;

A "test case" consists in a set of tests parameters and all the necessary elements to execute the function under test with those tests parameters. In structural unit testing, a tests case for f consists of the tests parameters and stubs for all functions that are called in f.

Figure 1:
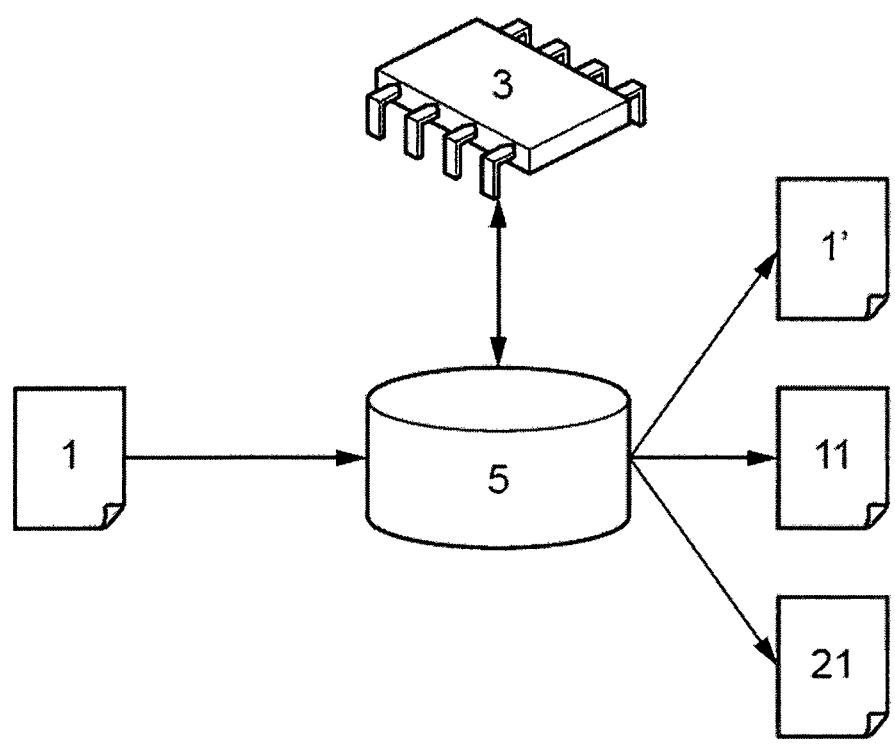
FIG. 1 is a general representation of a system according to the invention to implement a method according to the invention.

A computer system planned to implement a method according to the invention is represented on FIG. 1. Such a system comprises computer means 3, such like at least one processor, and a memory 5 accessible by the computer means 3. On the memory 5, the source-code 1 to test is registered. In some embodiments, some test parameters can be previously registered on the memory 5. In situations wherein a source-code is tested a first time, and then tested a second time after being amended, the test cases established at the first time can further be registered on the memory 5. In other words, some test cases can be initially stored and other ones can be progressively registered. After execution of a method according the invention, a completed source-code 1' is provided associated with a test case suite 11, 21. The completed source-code 1' comprises automatically added annotations with respect to the original source-code 1 provided at the beginning of the method.

Figure 2:
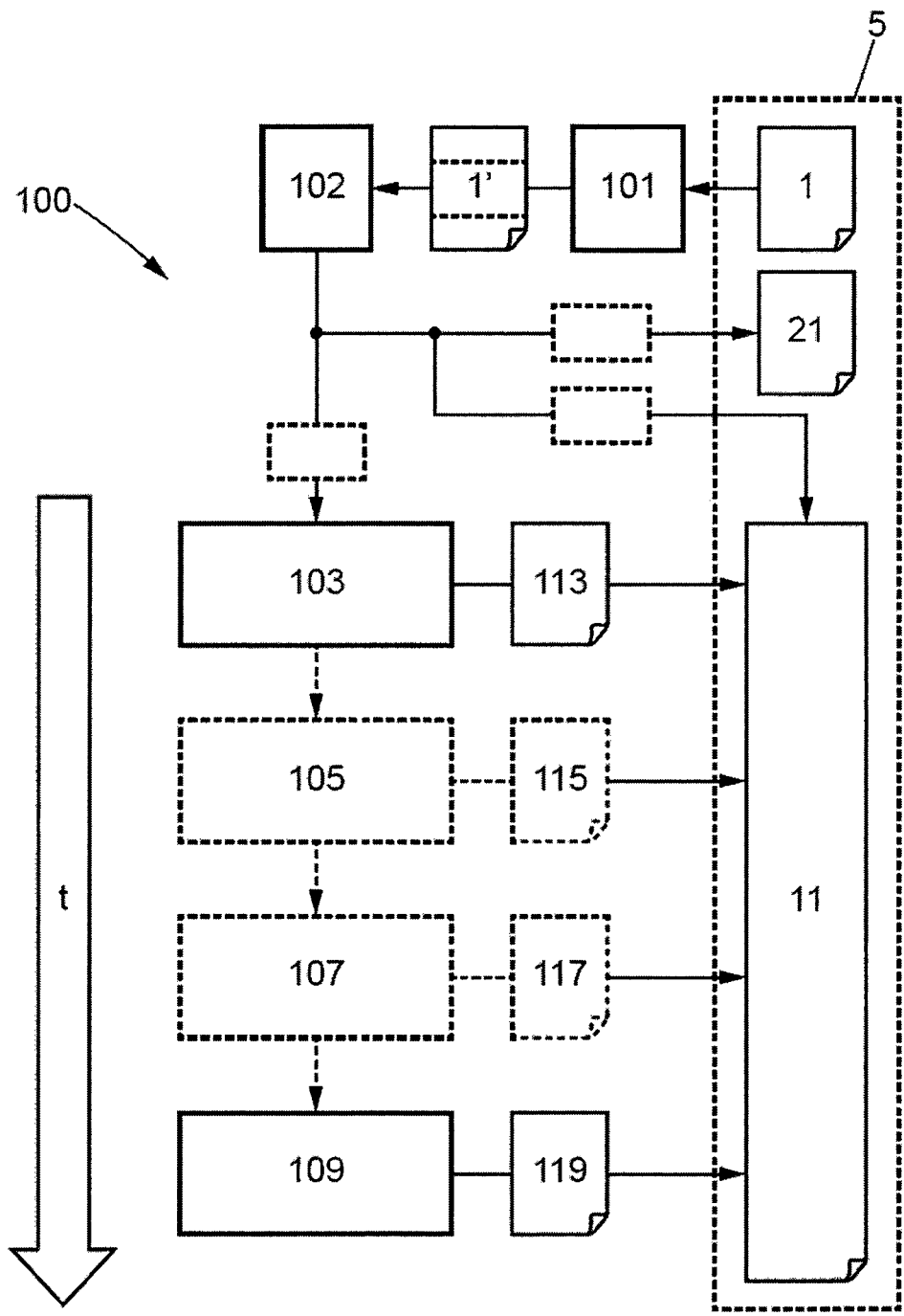
FIG. 2 is a general representation of a method according to the invention.

A method 100 according to the invention is represented on FIG. 2. The memory 5 contains a first list 11 of test cases. At the beginning of the method 100, the first list 11 is empty. The first list 11 is progressively fed with test cases during the implementation of the method 100. The memory 5 contains a second list 21 of test objectives related to the source-code 1 which are impossible to satisfy. At the beginning of the method, the second list 21 is empty. The second list 21 is progressively fed during the implementation of the method 100. The method 100 generates a structural test suite in the form of data progressively registered in the first list 11 and the second list 21 and associated to the source-code 1. The source-code 1 to test is an input for the method 100. The completed source-code 1' and the first and second lists 11, 21 are the outputs for the method 100.

The method comprises a step (referenced "a"). The step a comprises an implementation 101 of a structural analysis of the source-code 1. The structural analysis includes:
  parsing the source-code 1,
  addition of annotations defining tests objectives into the source-code 1,
  generation of stubs into the source-code 1.

As an example, the comparison of FIGS. 4 and 5 enables to understand, for a person skilled in software developing, how the tests objectives can be added to the source-code 1 in the form of annotations (lines beginning by "//" on FIG. 5). In other words, FIG. 4 is an example of a part of an original source-code 1 to test, while FIG. 5 is the corresponding part of the completed source-code 1' containing annotations after that the step a has been implemented. On FIG. 4, the lines referenced 51 contains a function "f(a, b)" to test. The lines referenced 53 contains a function "g(a)" called in the function "f(a, b)" to test. On FIG. 5, the annotations lines contain test objectives according to given coverage criterion. As it can be easily understood, the lines referenced 55 contains impossible test objectives. The treatment of such test objectives will be described hereinafter.

In the illustrated example, the coverage criterion contains simple limits: for the parameter "a" the following values are tested: k−1, k, k+1, the minimum value and the maximum value of "a", k being a constant equal to a limit condition of the tested function (equal to 10 and 12 in the example of FIGS. 4 and 5). In various embodiments, other criteria can be implemented, including more sophisticated criteria. For example, MC/DC coverage can be used ("MC/DC" for "Modified Condition/Decision Coverage") which is usually used in high performance technical field like in avionics software.

The adding of such annotations into the source-code 1 is automatic (made by the computer means 3 without human intervention).

FIG. 6 shows a generation of a stub: the result of the called function g(a) is replaced by the value "1" during the test of the function "f(a, b)". In other words, the called function can be replaced by dummy ones, which is needed to perform unit testing. Not only the function type signature of each stub is generated. The function body is also generated. Thus, the stub can be compiled without human intervention. For example, two kinds of stubs can be generated:
  Stubs to test the software in production: the stubs are generated so that the function under test combined with the stubs define all the referenced symbols;
  Stubs specific to each type of mathematical optimization or semantic analysis algorithm used to find tests parameters satisfying tests objectives.

In some embodiments, a semantic formal analysis of the source-code 1 further enables, for example, to find pseudo-constants and/or to prepare inputs for the following phases of the method 100. The word "pseudo-constant" means, here, variables that can have a small set of different values that can be determined for any possible execution of the source-code.

Usually, in the known process, the operation of stub generation is manual (made by a human). It takes an important part of the tests process. In case of integration tests (by opposition to unit testing), stubs can be generated at any depth of the call tree of the function under test. The stub generation applies to both unit testing and integration testing.

The addition of the annotations and the generation of stubs into the source-code 1 are ensured by a structural decomposition of the source-code 1 including a parsing of the said source-code 1. At the end of step a, the source-code 1 becomes the completed source-code 1', including annotations and stubs. Compared to fully manual, manual with software source parsing help and manual with software random or heuristically based inputs approaches, the described step a gives guarantees concerning the satisfaction of coverage criteria. For example, such approaches are defined in the following document: VectorCAST User Manual, Parasoft C/C++test User Manual.

Then, the method comprises a step referenced "b": implementing a semantic analysis algorithm 102 on the completed source-code 1'. The semantic analysis algorithm 102 enables to categorize each test objective. Examples of (known) semantic analysis are:
  the module "Value Analysis" of "Frama-C";
  "Bounded Model Checker for C" (CBMC);
  the module "PathCrawler" of "Frama-C".

Implementing a semantic analysis enables to categorize each set of tests objectives into a single one of the following categories:
  i/ set of tests objectives that are satisfied by using as inputs test cases including test parameters stored on the memory 5;
  ii/ set of tests objectives that are impossible to satisfy with any test case;
  iii/ set of tests objectives that are, at least temporarily, unsatisfied.

In other words, tests objectives categories (or classes) are:
  1. "Satisfied": a set of tests parameters that satisfy the test objective has been identified.
  2. "Impossible": it has been proven that the test objective cannot be satisfied.
  3. "Unclassified": the test objective is not handled (yet).

The semantic analysis enables finding test cases. In some embodiments, the number of tests parameters satisfying a set of tests objectives is further minimized. Thereby, any human review of generated test suite is facilitated, for example to fill expected output of tests in generated test suite.

In various embodiment, to implement a genetic algorithm before the semantic analysis can enabling to very quickly finds parameters for trivial test cases satisfying part of coverage criteria. Such a previous implementation of a genetic algorithm is optional.

The method comprises a step referenced "c": feeding the first list 11 of set of test cases with test cases that satisfy the test objectives of category i/.

The method comprises a step referenced "d": feeding the second list 21 of test objectives with test objectives that are impossible to satisfy and pertaining to category ii/. Each test objective of the category ii/ is associated with information about the reason of impossibility to be satisfied. The information is, preferably, in natural language, able to be understood by a human. By natural language, it has to be understood that the said information is planned to be read and used by a human to check the corresponding part of the source code 1. Preferably, using machine language or codes are avoided.

In the following of the method 100, an aim is to reduce, if possible to zero, the number of test objectives of the third category iii/ "unclassified".

The method 100 comprises a step referenced "e": if the category iii/ is not empty, implementing at least one mathematical optimization algorithm 103 (which could also be called "optimum search algorithm") on test objectives of category iii/. The step e includes:
  identifying test cases 113 that satisfy at least a part of said test objectives, feeding the first list 11 of set of test cases 113 with test cases that satisfy said test objectives,
categorizing said test objectives in category i/.

An example of (known) mathematical optimization algorithm is a genetic algorithm, which is an example pertaining to an Artificial Intelligence category of a mathematical optimization. A genetic algorithm finds parameters for less obvious test cases. In various embodiments, other examples of mathematical optimization can be used: Deep learning (Artificial Intelligence), simplex algorithms (Optimization algorithms), Simulated annealing (Heuristic category), Greedy algorithm (Heuristic category).

Semantic analysis algorithms enable to quickly and efficiently decrease the number of not handled test objective (category iii) either by (mathematically) proving the impossibility to satisfy the test objectives (category ii) and/or by finding new test parameters that satisfy them (category i).

In the method 100, the step b (at least one semantic analysis), for example by using the module "Value Analysis" of "Frama-C", is implemented before the step e (at least one mathematical optimization). Thus, resources (computer means 3 and time) are preserved when the mathematical optimization is then implemented by avoiding the mathematical optimization on test objectives impossible to satisfy (category ii).

The method 100 comprises a step referenced "f": providing a test suite comprising:
test cases of the first list 11 obtained in step c, and
test objectives impossible to satisfy associated with information about the reason of the impossibility of the second list 21 obtained in step d. In some embodiments, the step f further comprises providing the completed source-code 1'.

The test suite can have the form of a CSV files (Comma Separated Values). The C sources can be compiled with the stubs to perform unitary tests, for example with the commercial test software "CoverageMaster winAMS".

In some embodiments, a single semantic analysis of the source-code 1 is implemented (the step b). In various embodiments, at least one supplementary (thorough) semantic analysis can be implemented (step b') after the implementation of a mathematical optimization algorithm (after step e). Such a supplementary step consumes more resources (time) but enables to indicate the parameters for the remaining test cases or the absence of solution. In other words, such an optional and supplementary semantic analysis can be implemented, preferably after step e, in order to treat any objective test that can be still classified in category iii/.

In some embodiments, a first semantic analysis algorithm 102 is implemented (step b) in order to feed the first list 11 (step c) and the second list 21 (step d), and then, after having implemented the at least one mathematical optimization algorithm 103 (step e), a second semantic analysis algorithm, different from the first one, is implemented (step b'). This enables to feed again the first list 11 with some test cases 119 and the second list 21 with some impossible test objectives, respectively in steps c' and d'.

In some embodiments, a supplementary mathematical optimization algorithm 105, 107 is implemented. For example, a genetic algorithm implementation can refine the solution, like mixing the inputs, to obtain a smaller set of test samples while covering the same tests objectives. In other words, the step e can be implemented a first time with a first mathematical optimization algorithm 103, and then, the step e is implemented at least a second time with a second mathematical optimization algorithm 105 (and optionally with a third one 107) different from the first mathematical optimization algorithm.

After step f, the method 100 can be reiterated when the source-code 1 is changed. The test suite generated at the first time can be reused. A "fingerprint" mechanism can be used to identify the unmodified parts between two versions of a same source-code 1. This enables to avoid reproducing entirely the method on the entire source-code 1.

Figure 3:
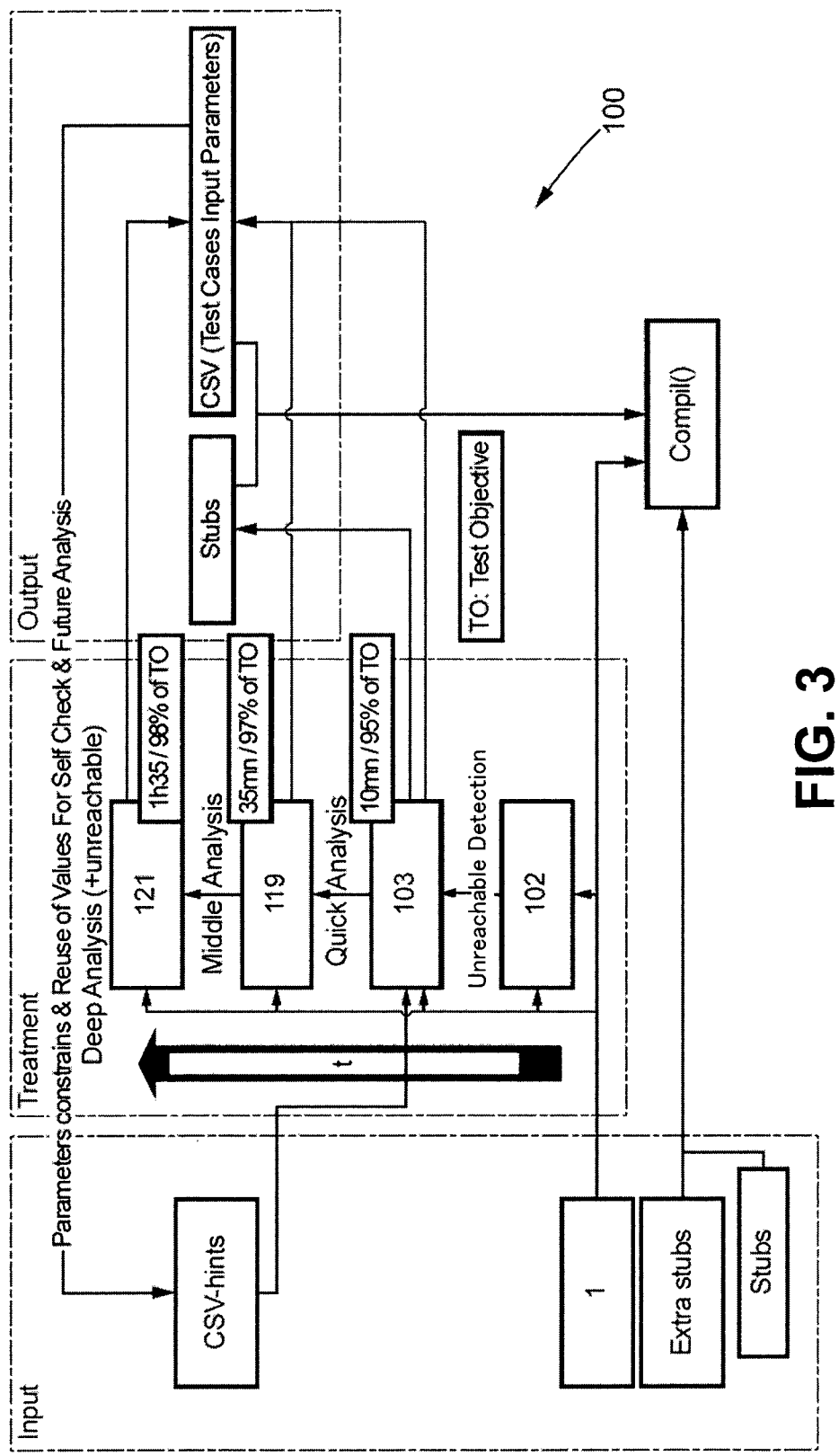
FIG. 3 is a representation of an embodiment of a method according to the invention.

FIG. 3 shows an example of implementation for generation of unitary tests on a source-code 1 in C language (60,000 lines of C code). It contains:
one block 103 for an mathematical optimization algorithm based on symbolic computations, and Genetic algorithm built on software called "erltools";
three blocks 102, 119, 121 for semantic analysis: the module "Value Analysis" of Frama-C, CBMC and the module "PathCrawler" (of Frama-C).

The FIG. 3 also gives as an example of the results obtained on the given set of input programs. The treatment of the C sources is done in four operations in the following order:
1. Classifying some test objectives as impossible by the module "Value Analysis" of Frama-C;
2. Finding test parameters for the test objectives by a Genetic algorithm. After these operations 1 and 2, 95% of the test suite is built in 10 minutes;
3. Finding more test parameters for the test objectives with CBMC which enables to build 97% of the test suite after a total of 35 minutes;
4. Finding more test parameters for the test objectives and classify some test objectives as "impossible to satisfy" with the module "Path Crawler" of Frama-C. It results in 98% of test suite found in 1 hour and 35 minutes.

The specific embodiment of FIG. 3 shows particularly good results. The examples values above depend on the used source-code 1 and computer means. There are given essentially to show that the method 100 enables to obtain quickly the most part of the test suite while to ensure completeness in much time. In other words, the final user can easily choose between a quick (but incomplete) test suite and a guaranteed complete test suite.

Some of known methods are limited to a specific computer language. For example, in C language, it is impossible to syntactically determine if a pointer function argument points to a scalar or an array, therefore additional manual information is usually needed (when known methods are used). In various embodiments of the method 100, supplementary manual annotations can be previously added in the test cases registered in the memory 5 in such a way to enhance the automatic identification of the test objectives (step a). The time and workforce needed to generate tests cases for coverage criteria are reduced. In addition, the method 100 gives a high completeness: for each impossible test objective, if there are any, explanations of the impossibility are provided. Human can check specifically such parts of the source-code 1. This facilitates any subsequent certification process for the source-code 1. For example, it is possible to pose assertions corresponding to the "Path predicates" in C code and then to verify them using the "WP" module of Frama-C.

The method 100 has been described as implemented by a computer system, including computer means 3 such as a processor and a memory 5. In another aspect, the method 100 can have the form of a computer software comprising instructions to implement the method 100 when the software is executed by any processor. The computer software can be recorded on a computer-readable non-transient recording medium.

The invention is not limited to the method, the system, the computer software and the computer-readable non-transient recording medium described here, which are only examples. The invention encompasses every alternative that a person skilled in the art would envisage when reading the present text.

The invention claimed is:

1. A method to generate a test suite for a source-code, test cases being stored on a memory accessible to a computer, the method being implemented by said computer, said method comprising:
   a) implementing a structural analysis of said source-code to obtain a completed source-code including:
   parsing the source-code,
   adding annotations defining test objectives into the source-code, and
   generating stubs corresponding to the source-code;
   b) implementing at least one semantic analysis algorithm on said completed source-code including categorizing the test objectives into the following categories:
      i) a first set test objectives that are satisfied by using as inputs test cases including test parameters stored on the memory;
      ii) a second set of test objectives that are impossible to satisfy with any test case; and
      iii) a third set test objectives that are, at least temporarily, unsatisfied;
   c) feeding a first list of a set of test cases with test cases that satisfy the test objectives of the category i;
   d) feeding a second list of test objectives with test objectives that are impossible to satisfy and pertaining to the category ii,
   e) implementing at least one mathematical optimization algorithm, on a basis of a presence of the set of test objectives in the category iii, on parts of said completed source-code corresponding to the test objectives of the category iii including:
   identifying test cases that satisfy at least a part of said test objectives in the category iii,
   feeding said first list of the set of test cases with test cases that satisfy said test objectives in the category iii; and
   f) providing the test suite, the test suite comprising said first list obtained in the step c and completed in the step e and said second list obtained in the step d, wherein each of the first, second and third sets of test objectives in the categories i, ii and iii comprises at least one of the test objectives.

2. The method according to claim 1, further comprising a supplementary preliminary step before the step b, the supplementary preliminary step comprising:
   implementing at least one second semantic analysis algorithm; and
   implementing at least one second mathematical optimization algorithm on second parts of said completed source-code, the implementing at least one second mathematical optimization algorithm including:
   identifying test cases that satisfy at least a part of said test objectives defined in the annotations, and
   feeding said first list of the set of test cases with test cases that satisfy said test objectives defined in the annotations.

3. The method according to claim 1, wherein the step e is implemented a first time with a first mathematical optimization algorithm, and then, the step e is implemented at least a second time with a second mathematical optimization algorithm different from the first mathematical optimization algorithm.

4. The method according to claim 1, wherein the step e is implemented at least one time with the at least one mathematical optimization algorithm, and then, before step f, a series of the following steps b', c' and d' is implemented at least one time:
   b') implementing at least one supplementary semantic analysis algorithm on the parts of said completed source-code corresponding to the test objectives of the category iii to categorize at least a second part of said test objectives into the categories i or ii;
   c') feeding said first list of the set of test cases with second test cases that satisfy the test objectives of the category i; and
   d') feeding said second list of test objectives with second test objectives that are impossible to satisfy and pertaining to the category ii.

5. The method according to claim 1, wherein the step d further comprises associating, with each of the test objectives impossible to satisfy and pertaining to the category ii, information about a reason of impossibility to be satisfied, said information being in a natural language.

6. The method according to claim 1, wherein the at least one semantic analysis algorithm is one of the following:
   a Value Analysis module of an abstract interpretation based analyzer,
   a Bounded Model-Checking based analyzer, and
   a concolic based analyzer module of the abstract interpretation based analyzer.

7. The method according to claim 1, comprising the following steps in the following order:
   implementing a Value Analysis module of an abstract interpretation based analyzer on said completed source-code;
   if the category iii is not empty, implementing a genetic algorithm on the parts of said completed source-code corresponding to the test objectives of the category iii;
   implementing a Bounded Model-Checking based analyzer analysis algorithm; and
   implementing a concolic based analyzer analysis algorithm of the abstract interpretation based analyzer.

8. A system comprising a processor and a memory storing computer-executable instructions, which implement the method of claim 1.

9. A non-transitory computer-readable recording medium on which a software is registered to implement the method according to claim 1 when the software is executed by a processor.

* * * * *